(No Model.)
J. S. SELLON.
SECONDARY BATTERY.
No. 396,770. Patented Jan. 29, 1889.
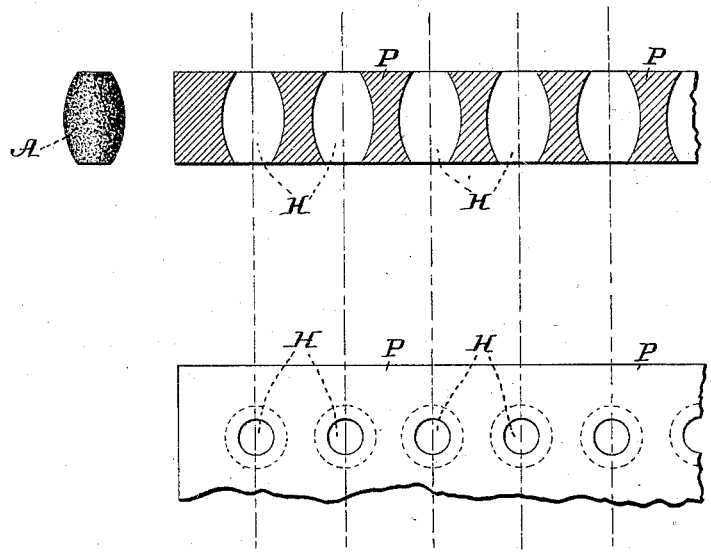
FIG _1ᵃ_   FIG _1_
Attest:
Geo. T. Smallwood.
Jas. K. McCathran
Inventor:
John S. Sellon
by A. Pollok
his attorney United States Patent Office.

JOHN S. SELLON, OF HATTON GARDEN, COUNTY OF MIDDLESEX, ENGLAND, ASSIGNOR TO THE ELECTRICAL ACCUMULATOR COMPANY, OF NEW YORK.

SECONDARY BATTERY.

SPECIFICATION forming part of Letters Patent No. 396,770, dated January 29, 1889.

Original application filed April 19, 1887, Serial No. 235,425. Divided and this application filed September 16, 1887. Serial No. 249,855. (No model.) Patented in England June 15, 1882, No. 2,818; in Russia July 23, 1882, No. 6,760; in Argentine Republic November 21, 1882, No. 354; in British Guiana December 11, 1882, No. 197/3,155; in Mexico January 27, 1883; in France March 10, 1883, No. 147,831; in Belgium March 10, 1883, No. 60,714; in Canada March 15, 1883, No. 16,499; in Italy March 20, 1883, No. 15,217; in Chili June 8, 1883; in Brazil June 16, 1883, No. 53; in Spain August 16, 1883, No. 917, and in Austria-Hungary September 29, 1883, No. 20,705.

*To all whom it may concern:*

Be it known that I, JOHN SCUDAMORE SELLON, a subject of the Queen of Great Britain and Ireland, resident at Hatton Garden, in the county of Middlesex, England, have invented certain new and useful Improvements in Secondary Batteries, (for which I have obtained Letters Patent as follows: Great Britain, No. 2,818, dated June 15, 1882; France, addition to No. 147,831, dated March 10, 1883; Austria-Hungary, No. 20,705, dated September 29, 1883; Italy, No. 15,217, dated March 27, 1883; Spain, No. 917, dated August 16, 1883; Russia, No. 6,760, dated July 23, 1882; Belgium, No. 60,714, dated March 10, 1883; Argentine Republic, No. 354, dated November 21, 1882; British Guiana, No. 197/3,155, dated December 11, 1882; Mexico, dated January 27, 1883; Canada, No. 16,499, dated March 15, 1883; Chili, dated June 8, 1883, and Brazil, No. 53, dated June 16, 1883,) of which the following is a specification.

My invention relates to secondary batteries or electrical accumulators, and more particularly to the supports, retainers, or frames in or upon which the active material is placed or packed. These plates I form with a series of perforations, in which the active material is placed or packed, the perforations being of such form that the active material, when in position, assumes the shape of a series of buttons having the geometrical form of a double cone or double pyramid joined. Such formation prevents the buttons from falling out of the perforations—that is to say, the buttons are key-locked, while each button of active material is comparatively small and is surrounded by a conductor or terminal from which the charging-current enters.

The accompanying drawings illustrate my invention.

Figure 1 is a cross-section of a plate or support having perforations formed as described. Fig. 1ª shows the form of the button of active material placed in the perforations.

The plate or support P is of conducting material—as a cast or rolled plate of lead—having holes or perforations H larger in cross-section at or near the center of the plate $c$ than at the surfaces.

A is the button of active material, preferably consisting of a paste of oxide of lead and dilute sulphuric acid molded into form by pressing the paste in the holes H. This button is in form a double cone or double pyramid—that is, two cones or pyramids united at their bases. The result of this formation is that the buttons are locked into position and can only be removed by breaking or fracturing.

I do not herein claim, broadly, a plate element or support having a series of perforations in which are located molded plugs or buttons of active material in the form of a double cone or pyramid, as that subject-matter is claimed in an application filed by me in the United States Patent Office April 19, 1887, Serial No. 235,425, of which this is a division.

What I claim, and desire to secure by Letters Patent, is—

1. In a secondary battery, a plate element or support having a series of holes or perforations the aperture or diameter of which is greater at the center than at the surfaces.

2. In a secondary battery, an element consisting of an active material combined with a plate or support having a series of holes or perforations the aperture or diameter of which is greater at or near the center than at the surfaces, substantially as described.

3. In a secondary battery, a molded plug or button of active material having the form of two cones or pyramids united at their base.

4. In a secondary battery, a plate element or support containing a series of molded plugs or buttons of active material, each plug or button having the form of two cones or pyramids united at their bases.

5. In a secondary battery, a plate element or support having cells, perforations, or receptacles the diameter of which at or near one or both poles of the major axis is less than the diameter at one or more points intermediate said poles.

6. In a secondary battery, a plate element or support having a series of holes or perforations the aperture or diameter of which at or near the surface is less than the aperture or diameter at a point between the surfaces of said plate, combined with an active material placed in such holes or perforations, substantially as described.

In testimony whereof I have signed my name to this specification in the presence of two subscribing witnesses.

JOHN S. SELLON.

Witnesses:
WM. JOHN WEEKS,
C. F. WATERMAN,
*Both of 9 Birchin Lane, London, E. C.*